United States Patent [19]

Date et al.

[11] Patent Number: 5,747,570
[45] Date of Patent: May 5, 1998

US005747570A

[54] WATER-ABSORBING RESIN COMPOSITION

[75] Inventors: Masashi Date, Osaka-fu; Keiji Tanaka, Kyoto-fu; Tsuyoshi Yuki, Kyoto-fu; Kenjiro Tsubota, Kyoto-fu; Satoshi Tamabuchi, Osaka-fu, all of Japan

[73] Assignee: Sanyo Chemical Industries, Ltd., Kyoto-fu, Japan

[21] Appl. No.: 539,084

[22] Filed: Oct. 4, 1995

[30] Foreign Application Priority Data

Dec. 6, 1994 [JP] Japan .................... 6-330608

[51] Int. Cl.⁶ .................. C08J 3/20; C08K 5/04; C08K 5/06; C08K 5/09
[52] U.S. Cl. .............. 524/161; 524/166; 524/167; 524/289; 524/302; 524/368; 524/381; 524/382; 524/392; 524/395
[58] Field of Search .................. 524/166, 368, 524/381, 395, 161, 392, 732, 733, 734, 167, 289, 302, 382; 525/54.31, 326.1, 327.3, 327.5, 328.5, 329.8

[56] References Cited

U.S. PATENT DOCUMENTS

| | | | |
|---|---|---|---|
| 2,601,253 | 6/1952 | Bruson | 524/368 X |
| 3,848,028 | 11/1974 | Engelhard | 524/368 |
| 5,073,587 | 12/1991 | Edwards | 524/166 |
| 5,143,999 | 9/1992 | Setiabudi et al. | 525/505 |

FOREIGN PATENT DOCUMENTS

| | | |
|---|---|---|
| A-63-260907 | 10/1988 | Japan . |
| A-1-62317 | 3/1989 | Japan . |
| A-1-103644 | 4/1989 | Japan . |

*Primary Examiner*—Judy M. Reddick
*Attorney, Agent, or Firm*—Merchant, Gould, Smith, Edell, Welter & Schmidt, P.A.

[57] ABSTRACT

Water-absorbing resin compositions obtained by adding a water-soluble thiol compound in the process of drying or pulverizing a hydrogel of a water-absorbing resin which is obtained by polymerizing a water-soluble monomer having a polymerizable unsaturated group optionally with a polysaccharide, in the presence of a crosslinking agent and water. Composition of the present invention are highly efficient in water absorption and safe for having extremely low amounts of residual monomer and water-soluble component.

6 Claims, No Drawings

5,747,570

WATER-ABSORBING RESIN COMPOSITION

FIELD OF THE INVENTION

This invention relates to water-absorbing resin compositions, and more specifically, to water-absorbing resin compositions having a reduced amount of unreacted monomer remaining in the resin (hereinafter abbreviated as residual monomer).

DESCRIPTION OF THE PRIOR ART

As a water-absorbing resin or a water-absorbing resin composition having a reduced amount of the residual monomer, ones obtained by adding reducing materials after polymerizing a resin, adding peroxide and/or azo compounds after polymerizing a resin, or irradiating an ultraviolet ray after polymerizing a resin have been proposed as disclosed in JP-A-1-62317, JP-A-1-103644, JP-A-63-260907.

Nevertheless, although residual monomer can be reduced by such methods, side reactions such as breakage of a main polymer chain or breakage of a crosslinking point of the water-absorbing resin would occur due to generation of excessive radical species as well as addition reactions or repolymerization reactions.

As a result, there have been problems such as deterioration of absorbing ability and increased amounts of the water-soluble component of the water absorbing resin due to the molecular weight decrease.

The inventors of the present invention earnestly have studied to solve the above-mentioned problems to find out that by adding a water-soluble thiol compound after polymerization, improved characteristics rectifying the above-mentioned problems can be achieved and accomplished the present invention.

SUMMARY OF THE INVENTION

The object of the present invention is to provide water-absorbing resin compositions which have decreased amounts of residual monomer content and water-soluble component, providing high water-absorbing ability.

The present invention relates to water-absorbing resin composition obtained by preparing a hydrogel of a water-absorbing resin (D) by polymerizing a water-soluble monomer having a polymerizable unsaturated group (A) or, polymerizing a water-soluble monomer having an unsaturated group (A) and a polysaccharide (B), in the presence of a crosslinking agent (C) and water, followed by adding a water-soluble thiol compound (E) at any stage after the polymerization.

The preferable embodiment of the present invention relates to water-absorbing resin composition obtained by preparing a hydrogel of a water-absorbing resin (D) by polymerizing a water-soluble monomer having a polymerizable unsaturated group (A) or, polymerizing a water-soluble monomer having an unsaturated group (A) and a polysaccharide (B), in the presence of a crosslinking agent (C) and water, followed by drying and pulverizing, and further adding a water-soluble thiol compound (E) in the process of drying or pulverizing the hydrogel of a water-absorbing resin (D).

DETAILED DESCRIPTION OF THE INVENTION

Examples of the water-soluble monomers (A) in the present invention include monomers having a polymerizable unsaturated group containing one or more of a carboxylic group, a sulfonic acid group and a phosphoric acid group, and salts thereof.

Examples of water-soluble monomers having a polymerizable unsaturated group containing a carboxylic group include unsaturated mono- or poly- carboxylic acids such as (meth) acrylic acid (which denotes acrylic acid and/or methacrylic acid, and this applies to the disclosure hereinafter), crotonic acid, sorbic acid, maleic acid, itaconic acid, cinnamic acid; and salts thereof such as maleic anhydride.

Examples of water soluble monomers having a polymerizable unsaturated group containing a sulfonic acid group include aliphatic or aromatic vinyl sulfonic acids such as vinyl sulfonic acid, allyl sulfonic acid, vinyl toluene sulfonic acid and styrene sulfonic acid; (meth)acrylic sulfonic acids such as sulfoethyl (meth)acrylate and sulfopropyl (meth) acrylate; (meth) acryl amide sulfonic acids such as 2-acryl amide-2-methyl propane sulfonic acid.

Examples of water soluble monomers having a polymerizable unsaturated group containing a phosphoric acid group include phosphoric acid monoesters of hydroxy alkyl (meth) acrylate such as 2-hydroxyethyl (meth)acryloyl phosphate and phenyl-2-acryloyloxyethyl phosphate.

Such water soluble monomers having a polymerizable unsaturated group containing the above mentioned acid group can be used alone or in combinations of two or more.

Among the above-mentioned examples, water-soluble monomers having a polymerizable unsaturated group containing a carboxylic acid group or sulfonic acid group are preferable, particularly preferable are water-soluble monomers having a polymerizable unsaturated group containing a carboxylic acid group.

Water-soluble monomers having a polymerizable unsaturated group containing an acid group can be used in the form of a water-soluble salt. And examples of such salts include alkali metal salts such as salts of sodium, potassium or lithium; alkali earth metal salts such as salts of calcium or magnesium; ammonium salts or amine salts such as alkylamine salts (methyl amine salt or trimethyl amine salt, etc.), alkanol amine salts (triethanol amine salt or diethanol amine salt, etc.); and the combination of two or more. Among these salts, the sodium salt and potassium salt are preferable.

As for the neutralization degree of water-soluble monomers having a polymerizable unsaturated group containing an acid group, a salt is usually contained from 50 to 90 mole percent, preferably from 60 to 80 mole percent based on the acid group after polymerization. When the neutralization degree is from 50 to 90 mole percent, since the viscosity of the obtained hydrogel polymer does not increase, the water-absorbing resin can be efficiently produced. Further, since the pH of the obtained polymer doesn't become too high, thus not providing irritation to human skin, it is preferable in terms of safety.

The neutralization can be carried out at an optional stage of water-absorbing resin production, such as in the stage of water-soluble monomers having a polymerizable unsaturated group or in the stage of a hydrogel as a polymerization product.

In the present invention, a polysaccharide (B) can be optionally added to (A). Examples of such polysaccharides (B) include starches and celluloses. Examples of starches include raw starches such as sweet potato starch, potato starch, wheat starch, corn starch and rice starch; processed starches such as oxidized starch, dialdehyde starch, alkyl etherified starch, allyletherified starch, oxyalkylated starch and aminoethyl etherified starch.

Examples of celluloses include celluloses obtained from lumbers, leaves, stalks, basts and seed fibers; processed celluloses such as alkyl etherified cellulose, organic acid esterified cellulose, oxidized cellulose and hydroxyalkyl etherified cellulose.

When a polysaccharide (B) is included, the ratio of (B) to a water-soluble monomer having a polymerizable unsaturated group (A) is usually from 0.1 to 30 weight %, preferably from 3 to 20 weight %. By using a polysaccharide within this range, the water absorbing ability deterioration of the obtained water-absorbing resin can be prevented.

Examples of crosslinking agents (C) include compounds having two polymerized double bonds (C-1) and compounds having at least one polymerized double bond and at least one functional group reactive with the monomer (A) (C-2).

Examples of the above-mentioned crosslinking agents (C-1) include the following:

① bis(meth)acrylamide:

N,N'-alkylene bis(meth)acryl amide having an alkylene group of from 1 to 6 carbon atoms, such as N,N-methylene bisacryl amide.

② di- or polyester of polyols and unsaturated mono- or polycarboxylic acid:

di- or tri- (meth)acrylate of polyols (such as ethylene glycol, trimethylol propane, glycerol, polyoxyethylene glycol and polyoxy propylene glycol);

unsaturated polyester obtained by the reaction of the above-mentioned polyols and an unsaturated acid (such as maleic acid); and di- or tri- (meth)acrylate ester obtained by the reaction of polyepoxide and (meth)acrylic acid.

③ carbamyl ester:

carbamyl ester obtained by the reaction of hydroxyethyl (meth)acrylate and a polyisocyanate (such as tolylene diisocyanate, hexamethylene diisocyanate, 4,4'-diphenyl methane diisocyanate, and NCO group-containing prepolymers obtained by the reaction of the above-mentioned polyisocyanates and a compound having active hydrogen atoms).

④ di- or poly- vinyl compound:

divinyl benzene, divinyl toluene, divinyl xylene, divinyl ether, divinyl ketone, trivinyl benzene, etc.

⑤ di- or poly- (meth)allyl ether of polyols:

di- or poly- (meth)allyl ether of such polyols as alkylene glycol having 2 to 4 carbon atoms, glycerol, polyalkylene glycol having an alkylene group of 2 to 4 carbon atoms, polyalkylene polyol having an alkylene group of 2 to 4 carbon atoms and carbohydrate. For example, polyethylene glycol diallyl ether, allylated starch, and callylated cellulose are included.

⑥ di- or poly- allylester of polycarboxylic acid:

diallyl phthalate, diallyl adipate, etc.

⑦ ester of unsaturated mono- or poly- carboxylic acid and polyol mono (meth) allyl ether:

(meth)acrylate of polyethylene glycol monoallyl ether.

⑧ allyloxy alkanes:

tetra allyloxy ethane, etc.

Examples of the crosslinking agents (C-2) include ethylenically unsaturated compounds having a group reactive with (meth)acrylic acid and/or other copolymerizable monomers, in other words, an ethylenically unsaturated compound having a group reactive with a group such as a carboxyl group or carboxylic anhydride group, for example, a hydroxyl group, an epoxy group and a cationic group. Concrete examples are unsaturated compounds having a nonionic group, including unsaturated compounds having a hydroxy group such as N-methylol (meth)acrylamide; unsaturated compounds having an epoxy group such as glycidyl (meth)acrylate; unsaturated compounds having a cationic group including unsaturated compounds having a quarternary ammonium salt such as N,N,N-trimethyl-N-(meth)acryloyloxyethyl trimethyl ammonium chloride, N,N,N-trimethyl-N-(meth)acryloyloxyethyl ammonium chloride; and unsaturated compounds having a tertiary amino group such as dimethyl amino ethyl (meth)acrylate and diethyl amino ethyl (meth)acrylate.

The above-mentioned crosslinking agents (C-1), (C-2) can be used in combinations of two or more.

In crosslinking agents (C), crosslinking agents (C-1) are preferable. In particular, bis(meth)acrylamide, di- or polyester of polyols with unsaturated monocarboxylic acids and allyloxy alkanes are preferable. Further, N,N-methylene bisacryl amide, ethylene glycol diacrylate, trimethylol propane triacrylate and tetra allyloxy ethane are more preferable.

The ratio of the crosslinking agent (C) to the total weight of the water-soluble monomer and crosslinking agent is generally from 0.0001 to 10 weight %, preferably from 0.001 to 5 weight %, more preferably from 0.01 to 2 weight %. It is preferable to use a crosslinking agent in the above-mentioned range since the obtained resin would have an appropriate gel strength in absorbing water and a good absorbing ability.

As the method of polymerizing in the presence of water in the present invention, a conventional method can be used. Examples of such conventional polymerization methods include aqueous solution polymerization using a radical polymerization catalyst, suspension polymerization, and reverse phase suspension polymerization. Further, as a method of initiating polymerization, a method of irradiating by radioactive ray, electron beam or ultraviolet ray can be adopted.

Examples of radical polymerization catalysts include azo compounds such as azobisisobutyronitrile, azobiscyanovaleric acid and 2,2'-azobis(2-amidinopropane)hydrochloride; inorganic peroxides such as hydrogen peroxide, ammonium persulfate, potassium persulfate and sodium persulfate; organic peroxides such as benzoyl peroxide, di-t-butyl peroxide, cumene hydro peroxide, succinic peroxide and di(2-ethoxy ethyl)peroxydicarbonate; and redox catalysts comprising the combination of a reducing agent such as a sulfite or a bisulfite salt of an alkali metal, ammonium sulfite, ammonium bisulfite, ascorbic acid, and an oxidizing agent such as persulfate of an alkali metal, ammonium persulfate, peroxides; and the combination of two or more of these.

Redox catalysts comprising the combination of hydrogen peroxide and ascorbic acid, or sodium persulfate and sodium bisulfite can be used as well. The amount of the catalysts is similar to those used in conventional methods of radical polymerization using such redox catalysts, generally from 0.0001 to 5 weight %, preferably from 0.0005 to 1 weight % based on the total weight of the polymerizable monomer and the crosslinking agent.

Conventional conditions can be applied in terms of other polymerization conditions such as polymerization concentration, polymerization initiating temperature, polymerization time, and maturing temperature.

A hydrogel of water-absorbing resin (D) obtained according to the above-mentioned method usually contains unreacted monomer from 1,000 ppm to 10,000 ppm. However, by adding a water-soluble thiol compound (E), the amount of such residual monomer can be reduced and a water-absorbing resin containing a low amount of water-soluble element can be provided.

It is preferable that water-soluble thiol compounds (E) used in the present invention are highly soluble in water and have a solubility of at least 10 weight % or more in an aqueous solution of 20% sodium acetate. Water soluble thiol compounds having low volatility are preferable in terms of odor. Preferable examples of such water-soluble thiol compounds include high molecular water-soluble thiol compounds and high crystalline water-soluble thiol compounds such as a carboxylic acid salt or a sulfonic acid salt.

Water soluble thiol compounds (E) include compounds containing a thiol group having (poly)oxyalkylene chain (E-1), represented by the general formula (1), aromatic carboxylic acid salt derivatives containing a thiol group (E-2), represented by formula (2), aromatic sulfonic acid salt derivatives containing a thiol group (E-3), represented by formula (3), alkylcarboxylic acid salt derivatives containing a thiol group (E-4), represented by formula (4), and alkylsulfonic acid salt derivatives containing a thiol group (E-5) represented by formula (5).

Compounds (E-1) are represented by formula (1):

$$HS-(CH_2CHO)_n-X^1 \quad (1)$$
$$\quad\quad\quad\quad |$$
$$\quad\quad\quad\quad R^1$$

wherein:

$R^1$ is H or $CH_3$;

n is a positive integer; and $X^1$ is H, an alkyl group having 1 to 4 carbon atoms or $$-CH_2CHR^1$$
$$\quad\quad |$$
$$\quad\quad SH \ .$$

In the above-mentioned formula (1), n is not particularly limited but generally from 1 to 500, preferably from 8 to 250.

Compounds (E-2) are represented by formula (2):

$$(HS-X^2)_m-Ph(X^3)_k(COOM) \quad (2)$$

wherein:

$X^2$ is a $-CH_2CH_2O-$ group or a $-CH_2CH_2OCO-$ group;

m and k are either 1 or 2;

Ph is a phenyl group;

$X^3$ is H or $-COOM$; and

M is an alkali metal.

Compounds (E-3) are represented by formula (3)

$$(HS-X^4)_m-Ph(SO_3M) \quad (3)$$

wherein:

$X^4$ is $-CH_2CH_2O-$;

m is 1 or 2;

Ph is a phenyl group; and

M is an alkali metal.

Compounds (E-4) are represented by formula (4):

$$[HS(X^5)_p]_q-C(X^6)_{3-q}COOM \quad (4)$$

wherein:

$X^5$ is $-CH_2-$;

p is 0 or 1;

q is 1 or 2;

$X^6$ is H or $-CH_2-$; and

M is an alkali metal.

Compounds (E-5) are represented by formula (5):

$$[HS(X^7)_p]_q-C(X^8)_{3-q}SO_3M \quad (5)$$

wherein:

$X^7$ is $-CH_2-$;

p is 0 or 1;

q is 1 or 2;

$X^8$ is H or $-CH_3-$; and

M is an alkali metal.

Concrete examples of polyoxyalkylene compounds containing a thiol group (E-4) include polyethylene glycol of molecular weight of 400, having one end or both ends modified with SH. Concrete examples of aromatic carboxylic acid salt derivatives containing a thiol group (E2) include sodium salts of dimercapto ethyl pyromellitate, and sodium salts of monomercapto ethyl ether phenyl sodium sulfonate. Concrete examples of alkylcarboxylic acid salt derivatives containing a thiol group (E-4) include mercapto sodium propionate. Concrete examples of alkylsulfonic acid salt derivatives containing a thiol group (E-5) include mercapto ethyl sodium sulfonate. Among these examples, (E-1) and (E-2) compounds are preferable, and (E-2) compounds are particularly preferable.

The amount of water soluble thiol compounds (E) used in the present invention is generally from 0.001 to 8 weight %, preferably from 0.01 to 5 weight % based on the total weight of water soluble monomers having polymerizable unsaturated group (A) and crosslinking agent (C). It is preferable to add water soluble thiol compounds (E) in the range of by 0.001 to 8 weight % because it achieves a water absorbing resin composition having a good water absorbing ability and a little water-soluble component. Even if the compounds are added by over 8 weight %, it makes little contribution to reducing the residual monomer content further, and thus is wasteful.

The hydrogel of a water absorbing resin (D) can be added to the water-soluble thiol compound (E) at any stage after polymerization. If the water soluble thiol compound (E) is added before or during polymerization, it would prevent polymerization.

A "stage after polymerization" includes a stage after polymerization before drying, a stage during drying, a stage after drying, a stage before pulverization, a stage during pulverization and a stage after pulverization before completing the finished product. Among these stages, a stage after polymerization before drying and a stage after pulverization before completing the finished product are preferable.

In the present invention, a water-soluble thiol compound (E) can be added in a state of powder or liquid. However, it is preferably added in the form of an aqueous solution or water dispersion for homogeneous addition.

Methods of adding at a stage after polymerization before drying include a method of immersing a hydrogel (D) into the aqueous solution or dispersion of the water-soluble thiol compound (E), a method of spraying the aqueous solution or dispersion of (E) to the hydrogel (D) and a method of mixing the pulverized hydrogel (D) and (E).

Methods of adding (E) to a pearl like hydrogel obtained by reverse phase suspension polymerization include a method of adding a water soluble thiol compound (E) to a polymer suspension under stirring at a stage after polymerization before eliminating solvent and a method of spraying an aqueous solution or dispersion of (E) to the pearl like hydrogel at a stage after eliminating the solvent.

When a water-soluble thiol compound (E) is added to a hydrogel (D), the temperature of the subsequent heat-drying is, in general 100° to 230° C., preferably 120° to 190° C. However, when dried at a reduced pressure, the drying temperature can be under 100° C. A conventional drying method can be used, and examples of such drying methods include a method of loading the material on porous plates, wire gauzes, flat plates, or belts and drying by each batch or drying continuously, a method of hot-air drying in a rotary kiln or a fluidized bed drying oven, a method of heat drying by contacting to the surface of a hot plate or a hot roller and a method of heat drying with reduced pressure.

The surface of the water soluble resin composition particles obtained in the present invention may be further processed by conventional surface crosslinking using a cross linking agent such as a polyglycidyl ether compound or a polyvalent metal compound.

Practical examples of polyglycidyl ether compounds include ethylene glycol diglycidyl ether, propylene glycol diglycidyl ether, glycerin-1,3-diglycidyl ether, glycerin triglycidyl ether, polyethylene glycol diglycidyl ether, tetraglycerol polyglycidyl ether and hexaglycerol polyglycidyl ether.

Examples of polyvalent metal compounds include hydroxides of such alkali earth metals as calcium and magnesium; zinc; aluminum; and titanium; halides of these metals and salts of these metals such as sulfates, carbonates and acetates of these metals.

The amounts of the residual monomer and water-soluble component in the water absorbing resin composition of the present invention obtained by the above-mentioned procedure are in general, less than 500 ppm and less than 7 weight %, respectively. By applying preferable conditions, the residual monomer content can be less than 300 ppm and the amount of water soluble component can be less than 5 weight %.

The amounts of the residual monomer and the water soluble component in the present invention are calculated based on the total weight of the obtained water-absorbing resin composition including a water-soluble thiol component. However, the amounts of the residual monomer and the water soluble component in the Comparative Example 1 are based on the weight of the water-absorbing resin only, because any water-soluble thiol component is not included in the material obtained in the Comparative Example 1. The amounts in the Comparative Examples 2 and 3 are based on the total weight of the water-absorbing resin including each additive which is disclosed in the Comparative Examples 2 and 3.

EXAMPLE

The present invention will be further illustrated with reference to Examples and Comparative Examples hereinafter. However, the present invention is not limited only to the embodiments illustrated in the Examples and Comparative Examples herein.

The water-solubility of the thiol compound, the residual monomer content, the amount of the water-soluble component and absorbing amount of the water absorbing resin composition described in the Examples and the Comparative Examples are the values calculated by the following operation.

<Solubility>

A thiol compound was gradually added to 10 g of a 10 weight % and 20 weight % aqueous solution of sodium acetate at 25° C. with stirring, respectively. The amount of the thiol compound (weight (A) g) was measured at the point where deposition or cloudiness was visually observed. The solubility was calculated from the below-mentioned formula.

Solubility (%)=(A/10)×100

<Residual monomer content>
(Preparation of sample solution)

1 g of a water absorbing resin composition was placed in a 300 ml-beaker and 249 g of 0.9 weight % aqueous solution of sodium chloride was added thereto, followed by stirring with a magnetic stirrer for 3 hours. The filtrate, after removing any gel with a paper filter, was used as a sample solution.

(Measurement)

A sample solution was poured into a liquid chromatograph and the area of the peak due to the residual monomer therein was measured. The calibration curve (the relationship between the monomer amount and the area of the peak) of a monomer of a known concentration was prepared to determine the residual monomer content of the sample solution with reference to the prepared calibration curve.

<Water-soluble component>

A figure after extracting for 3 hours was determined as the water-soluble component amount according to the method of the "Extractable Polymer Content Determination" disclosed in P.23 L.4 of the left-upper column to P.24 the sixth line from the bottom of the right-lower column of JP-A-62-54751 (Column 21, line 5 to column 23 line 50 of the corresponding U.S. Pat. No. 4,654,039).

<Absorbing amount>

1.00 g of the water absorbing resin exactly measured was p lac ed in a 250 mesh nylon bag and immersed in a 0.9 weight % aqueous solution of sodium chloride for one hour. After draining for 15 minutes, the weight (a) g was measured. Also, the same procedure was conducted with the bag not having the sample therein and the weight (b) was measured. The absorbing amount was calculated from the below-mentioned formula.

Absorbing amount (g/g)=[(a)−(b)]−1

Example 1

① 196 g of acrylic acid, 0.05 g of methylenebisacrylamide and 675 g of deionized water were mixed and the polymerizable monomer solution was prepared. The mixture liquid was placed in a polymerizing container which allows adiabatic polymerization. By keeping the temperature at 5° C. or less and introducing nitrogen gas thereto, the dissolved oxygen amount in the solution was reduced to 1 ppm or less. Then 0.03 g of a 35% aqueous solution of hydrogen peroxide, 0.005 g of ascorbic acid, 0.05 g of 2,2'-azobis(2-methylpropionamidine)dihydrochloride ("V-50" commercially available from Wako Pure Chemical Industries, Ltd.) were added thereto. After 10 minutes a temperature rise to show the initiation of polymerization was observed. And approximately after 3 hours the solution reached equilibrium at 65° C. After 4 hour maturation, the polymerized hydrogel was obtained.

② After pulverizing 600 g of the polymerized hydrogel with a meat chopper, 165 g of a 48% aqueous solution of NaOH, and an aqueous solution, preliminarily prepared by dissolving 2.4 g polyethylene glycol denaturated with thiol at both ends having molecular weight of 400 (E-1) in 22 g of water, were added thereto. Then the solution was further homogenously mixed by means of the meat grinder.

The obtained gel, neutralized and mixed with water-soluble thiol, was dried with hot-air at 130° C. followed by pulverization by means of a mixer for domestic use to a particle size of 20 mesh or smaller, and the water soluble resin composition of the present invention were obtained.

The solubility of the water-soluble thiol compound in a 10 weight % and 20 weight % aqueous solution of sodium acetate, residual monomer content, water-soluble component amount, and absorption amount for this water-soluble resin composition are described in Table 1.

Examples 2–5

Water-absorbing resin composition of the present invention were obtained in the same conditions as Example 1 except for the kind and the amount of the water-soluble thiol compound added to the polymer hydrogel. The solubility of a water-soluble thiol compound in a 10 weight % and 20 weight % aqueous solution of sodium acetate, residual monomer content, water-soluble component amount, and absorption amount of this water-soluble resin composition were measured.

The results are described in Table 1.

Comparative Example 1

The result of the case when a water-soluble thiol compound (E-1) was not added in Example 1 is described in Table 1.

Comparative Example 2

The result of the case when sodium sulfite was added instead of water-soluble thiol compound (E-1) is described in Table 1.

Comparative Example 3

The result of the case when 4 g of a compound of ethylene glycol 2 mols adduct of bisphenol A having both ends denaturated with an SH group (BPES) was added instead of water-soluble thiol compound (E-1) is described in Table 1.

TABLE 1

| | | Residual monomer decreasing agent | | residual monomer content | water soluble component | absorbing amount |
|---|---|---|---|---|---|---|
| | kind | Solubility (wt %) | | (ppm) | (wt %) | (ml/g) |
| | | a | b | | | |
| Example 1 | E-1 | 50 | 15 | 95 | 3 | 58 |
| Example 2 | E-2 | 25 | 13 | 85 | 3 | 59 |
| Example 3 | E-3 | 21 | 11 | 105 | 3 | 59 |
| Example 4 | E-4 | over 100 | 20 | 120 | 3 | 58 |
| Example 5 | E-5 | over 100 | 20 | 110 | 3 | 58 |
| Comparative Example 1 | not added | — | — | 1650 | 3 | 59 |
| Comparative Example 2 | sodium sulfite | 10 | 5 | 105 | 11 | 51 |
| Comparative Example 3 | BPES | 0 | 0 | 1600 | 3 | 59 |

E-1: polyethylene glycol (molecular weight of 400) having both ends denaturated with thiol
E-2: sodium salts of dimercaptoethyl pyromellitate
E-3: mercaptoethylether phenyl sodium sulfonate
E-4: mercapto sodium propionate
E-5: mercaptoethyl sodium sulfonate
BPES: ethylene glycol 2 mols adduct of bisphenol A having both ends denaturated with thiol
a: solubility to 10 weight % aqueous solution of sodium acetate
b: solubility to 20 weight % aqueous solution of sodium acetate As can be seen from Table 1, since compositions of the present invention have little residual monomer content, they provide safety without liability of irritating human skin, and since they have an extremely low amount of water-soluble components, they are efficient in water-absorption.

Since water-absorbing resin composition of the present invention have the above-mentioned advantages, they are useful in various industrial applications such as; an application in contact with a human body such as water-absorbing pads and hygienic materials including disposable diapers for infants or adults, sanitary napkins, hygienic cottons, bandages, incontinence pads and paper towels; an application with possibility of contacting to foods such as freshness retaining materials for vegetables and fruits or drip absorbers for meat or marine products; an application for water retaining materials for plants or soils; and an application for anti-dewing agents for interior materials of construction.

What is claimed is:

1. A water-absorbing resin composition obtained by preparing a hydrogel of a water-absorbing resin (D) by polymerizing a water-soluble monomer having polymerizable unsaturated group (A) or, polymerizing a water soluble monomer having an unsaturated group (A) and a polysaccharide (B), in the presence of a crosslinking agent (C) and water, followed by adding a water-soluble thiol compound (E) at any stage after the polymerization.

2. A water-absorbing resin composition obtained by preparing a hydrogel of a water-absorbing resin (D) by polymerizing a water-soluble monomer having polymerizable unsaturated group (A) or, polymerizing a water soluble monomer having an unsaturated group (A) and a polysaccharide (B), in the presence of a crosslinking agent (C) and water, followed by drying and pulverizing, and further adding a water-soluble thiol compound (E) in the process of drying or pulverizing the hydrogel of a water-absorbing resin (D).

3. The water-absorbing resin composition according to claim 1, wherein the water-soluble thiol compound (E) is a water-soluble thiol compound having at least one selected from the group consisting of (poly)oxyalkylene chain, a carboxylic acid group, a carboxylic acid salt group, a sulfonic acid group and a sulfonic acid salt group, and having a solubility of 10 weight % or more in a 20 weight % aqueous solution of sodium acetate.

4. The water-absorbing resin composition according to claim 1, wherein the amount of the residual monomer is less than 500 ppm and the water soluble compound is less than 7 weight %.

5. The water-absorbing resin composition according to claim 1, wherein the amount of the residual monomer is less than 300 ppm and the water soluble compound is less than 5 weight %.

6. The water-absorbing resin composition according to claim 1, wherein the water-soluble thiol compound (E) is one selected from the group consisting of:

  (1)

wherein:

$R^1$ is H or $CH_3$;

n is a positive integer; and $X^1$ is H, an alkyl group having 1 to 4 carbon atoms or

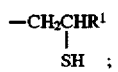

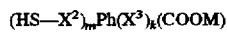  (2)

wherein:

$X^2$ is a —CH$_2$CH$_2$O— group or a —CH$_2$CH$_2$OCO— group;

m and k are 1 or 2;

Ph is a phenyl group;

$X^3$ is H or —COOM; and

M is an alkali metal;

$$(HS—X^4)_m Ph(SO_3M) \qquad (3)$$

wherein:

$X^4$ is —CH$_2$CH$_2$O—;

m is 1 or 2;

Ph is a phenyl group; and

M is an alkali metal;

mercapto alkali metal propionate; and mercapto ethyl alkali metal sulfonate.

* * * * *